(12) United States Patent
Brennessl et al.

(10) Patent No.: US 10,785,414 B1
(45) Date of Patent: Sep. 22, 2020

(54) SYNCHRONIZED VISUAL INDICATORS FOR MULTIMEDIA DEVICE ACTIONS (71) Applicant: Facebook Technologies, LLC, Menlo Park, CA (US)

(72) Inventors: Tomas Brennessl, San Francisco, CA (US); Benjamin John Parfitt, Pacifica, CA (US); Robert William Hanley, Redwood City, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/673,154

(22) Filed: Nov. 4, 2019

(51) Int. Cl.
*H04N 5/232* (2006.01)
*H04N 7/15* (2006.01)
*G06F 3/14* (2006.01)

(52) U.S. Cl.
CPC ..... *H04N 5/232933* (2018.08); *G06F 3/1454* (2013.01); *H04N 5/232939* (2018.08); *H04N 7/15* (2013.01)

(58) Field of Classification Search
USPC ....................................................... 348/14.01
See application file for complete search history.

(56) References Cited

U.S. PATENT DOCUMENTS

| | | | |
|---|---|---|---|
| 2007/0291736 A1* | 12/2007 | Furlong | H04L 12/2838 370/352 |
| 2009/0269027 A1* | 10/2009 | Bedingfield, Sr. | H04N 21/47202 386/248 |
| 2011/0202956 A1* | 8/2011 | Connelly | H04N 21/4755 725/38 |
| 2015/0181367 A1* | 6/2015 | Nguyen | H04W 76/14 455/426.1 |
| 2015/0339391 A1* | 11/2015 | Kang | G06F 16/532 707/722 |
| 2016/0037187 A1* | 2/2016 | Das | H04N 21/2541 725/62 |
| 2018/0131142 A1* | 5/2018 | Satheesh | H01R 13/7175 |
| 2018/0211665 A1* | 7/2018 | Park | G06F 1/3231 |

* cited by examiner

*Primary Examiner* — Maria El-Zoobi
(74) *Attorney, Agent, or Firm* — FisherBroyles, LLP (57) ABSTRACT

The disclosed computer-implemented method may include (i) identifying, by a multimedia device that is connected to an external display, an action that is to be performed by the multimedia device, (ii) selecting, by the multimedia device, at least one visual pattern that corresponds to the action, and (iii) displaying, when the multimedia device performs the action, the visual pattern simultaneously on both the multimedia device and the external display to visually indicate that the action is being performed. Various other methods, systems, and computer-readable media are also disclosed.

20 Claims, 9 Drawing Sheets

SYNCHRONIZED VISUAL INDICATORS FOR MULTIMEDIA DEVICE ACTIONS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Multimedia devices often transmit output for display on an external display. For example, a device designed for videoconferencing may send video and/or other user interface (UI) elements to a television screen. In some cases, it may not be immediately apparent to users what state the multimedia device is in. For example, if the multimedia device is booting up, receiving an incoming call, processing a command, and/or performing some other action, this action may not be reflected on the external display or the device itself. The present disclosure, in contrast, is directed to new and improved systems and methods for generating and displaying synchronized visualizations that reflect the state of a multimedia device connected to an external display.

The present disclosure is generally directed to a multimedia device connected to an external display that generates and displays mirrored UI animations simultaneously on both the external display and the device itself. Each unique animation may correspond to (and/or visually indicate) a different system state of the device, such as listening, thinking, responding, booting up, shutting down, etc., so that users can quickly and easily identify the current state of the device. The multimedia device may mirror the animations on both the device and the external display in a variety of ways, including by emitting a sequence of light using a horizontal array of light emitting diodes (LED)s incorporated into the device itself while simultaneously causing the external display to generate and display a graphical representation of the same light sequence or animation. In some cases, the animations can be overlaid on top of multimedia content (such as a video conference stream) displayed on the external display. The device may also generate and transmit additional data for display by the external display, such as text ("Calling Marie Johnson") or audio ("Booting Up").

In some embodiments, the device itself (which may be used for video calls and/or other interactive activities) may include a camera, a microphone, one or more speakers, and/or a stand that allows the device to be mounted on the external display (e.g., a television or computer monitor) or placed on a surface. In some embodiments, the horizontally elongated body of the device may also include one or more buttons for operation, an indicator light visible to a user, a physical camera shutter, and/or horizontally extending louvers that hide various components, such as the speakers. As will be explained in greater detail below, embodiments of the present disclosure may improve the usability of a display and/or a multimedia device by providing users with an easy-to-understand visualization of the state of the multimedia device.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 1:
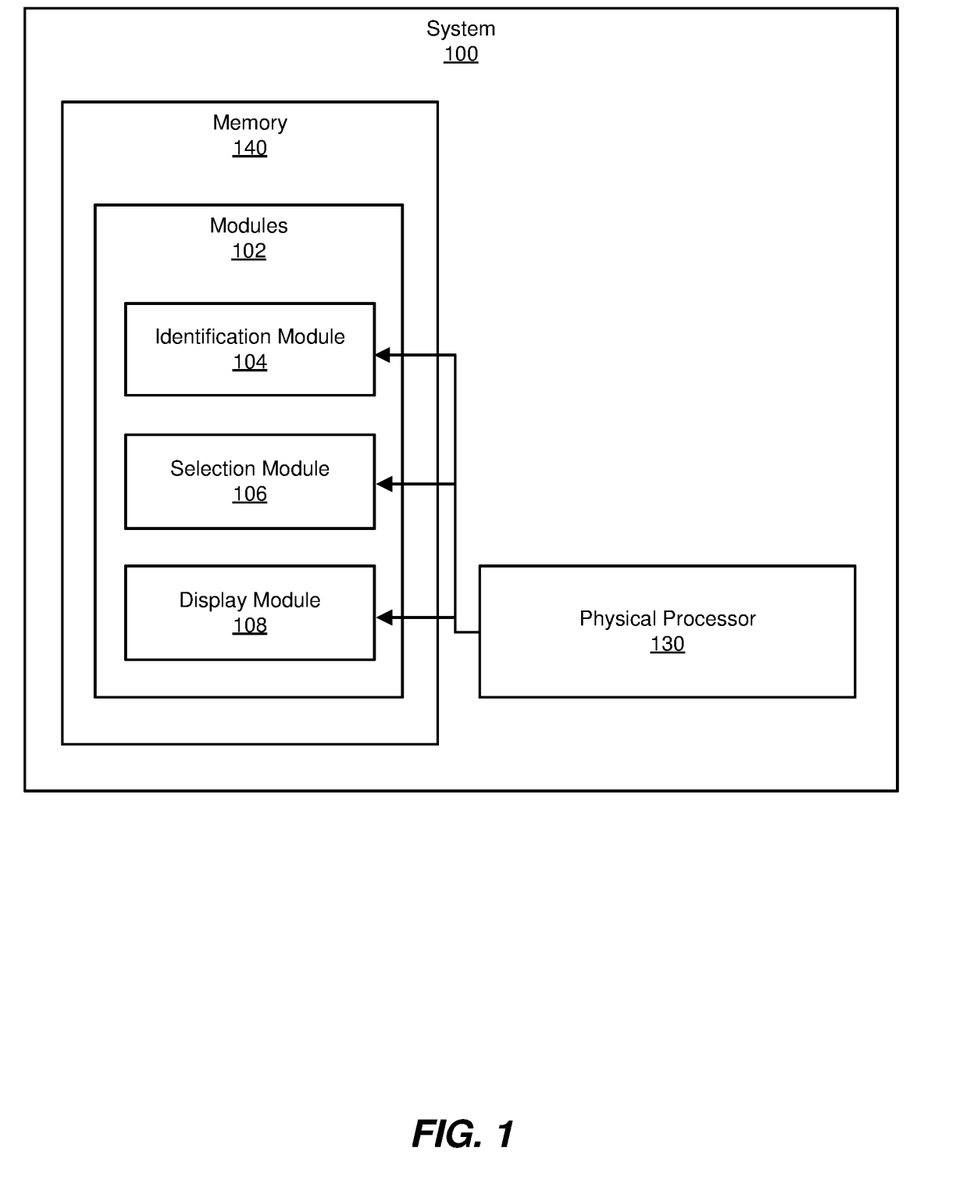
FIG. 1 is a block diagram of an exemplary system for displaying synchronized visual indicators for multimedia device actions.
Figure 2:
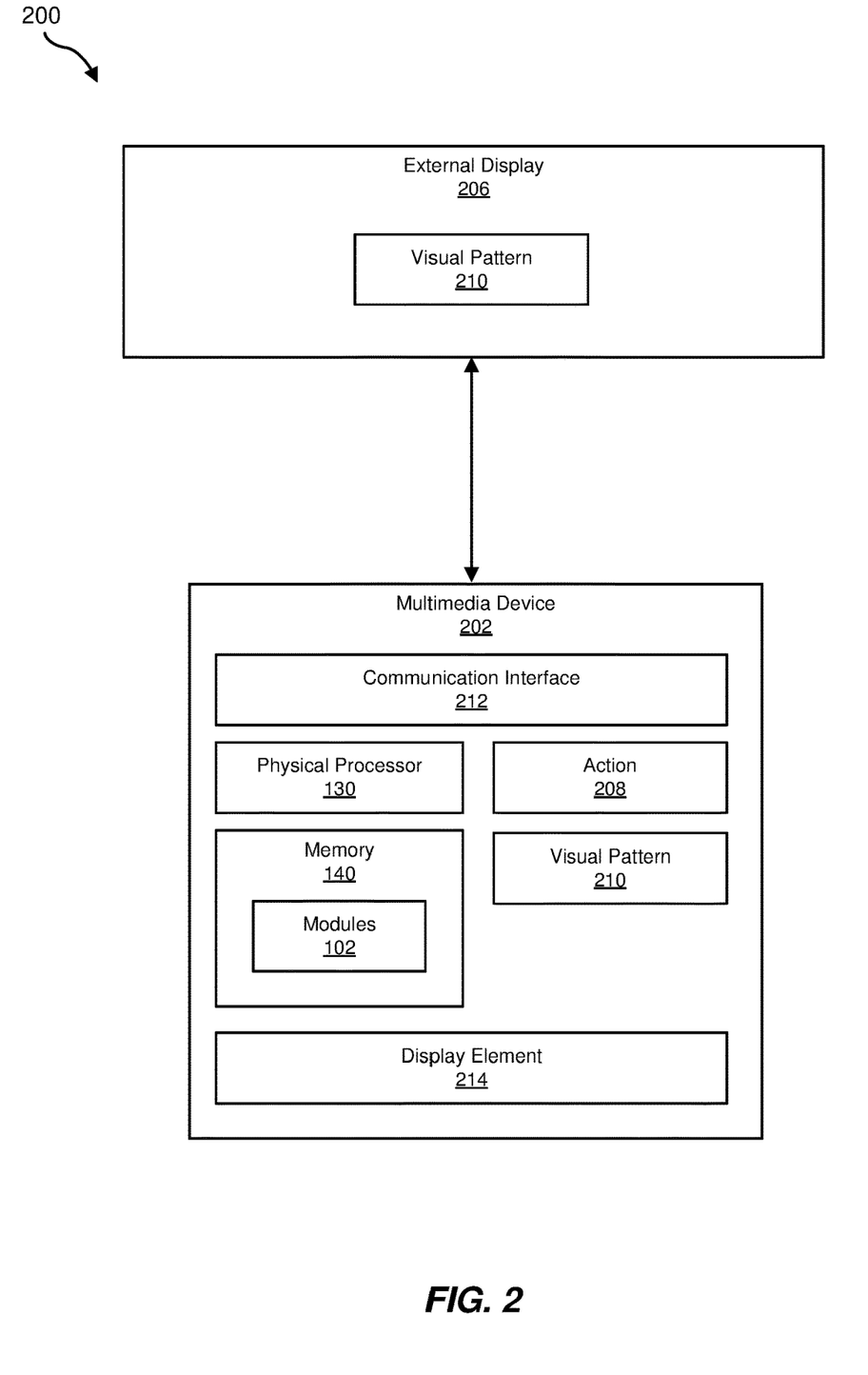
FIG. 2 is an additional block diagram of an exemplary system for displaying synchronized visual indicators for multimedia device actions.

The following will provide, with reference to FIGS. 1-2, detailed descriptions of systems for displaying synchronized visualizations. In addition, the following will provide, with reference to FIG. 3, detailed descriptions of a method for displaying synchronized visualizations. Detailed descriptions of illustrations of exemplary synchronized visualizations will be provided in reference to FIGS. 4-8.

FIG. 1 is a block diagram of an example system 100 for displaying synchronized visual indicators for multimedia device actions. As illustrated in this figure, example system 100 may include one or more modules 102 for performing one or more tasks. As will be explained in greater detail below, modules 102 may include an identification module 104 configured to identify, by a multimedia device that is connected to an external display, an action that is to be performed by the multimedia device. Modules 102 may also include a selection module 106 configured to select, by the multimedia device, at least one visual pattern that corresponds to the action. In addition, modules 102 may include a display module 108 configured to display, when the multimedia device performs the action, the visual pattern simultaneously on both the multimedia device and the external display to visually indicate that the action is being performed. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as multimedia device 202 illustrated in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a multimedia device 202 in communication with and/or coupled to an external display 206. In one example, all or a portion of the functionality of modules 102 may be performed by multimedia device 202 and/or external display 206. As will be described in greater detail below, one or more of modules 102 from FIG. 1 may, when executed by at least one processor of multimedia device 202, enable multimedia device 202 to synchronize the visual display of action indicators.

Figure 3:
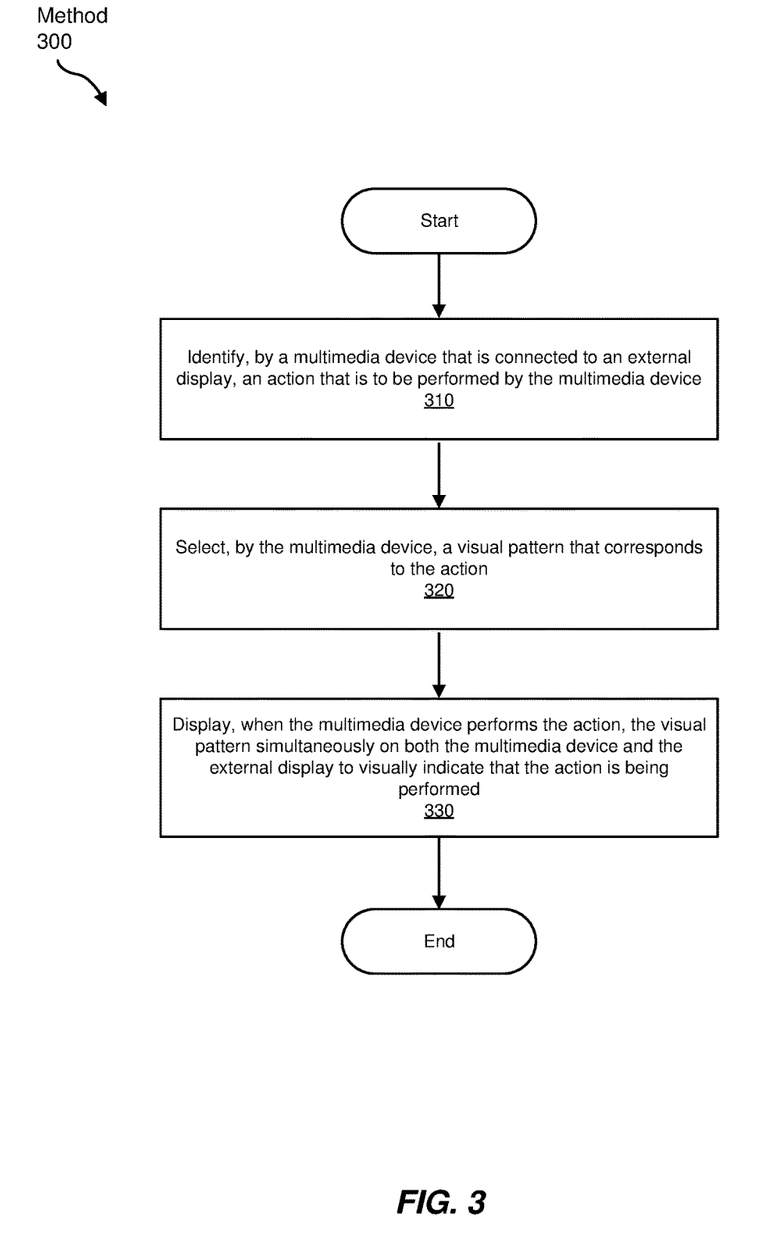
FIG. 3 is a flow diagram of an exemplary method for displaying synchronized visual indicators for multimedia device actions.

FIG. 3 is a flow diagram of an exemplary computer-implemented method 300 for displaying synchronized visualizations. The steps shown in FIG. 3 may be performed by any suitable computer-executable code and/or computing system, including the system(s) illustrated in FIGS. 1 and 2. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify, by a multimedia device that is connected to an external display, an action that is to be performed by the multimedia device. For example, identification module 104 on multimedia device 202 in FIG. 2 may identify an action 208.

In some embodiments, the term "multimedia device" may refer to a device capable of receiving, recording, generating, producing, storing, transmitting, and/or emitting video and/or audio data. In some examples, a multimedia device may facilitate voice calls and/or video conferencing by recording, transmitting, or otherwise streaming video and/or audio data from the multimedia device and/or an additional device (e.g., an external display such as a television screen). In some embodiments, a multimedia device may perform additional functions, such as interfacing with one or more web sites, web applications, and/or other applications. For example, a multimedia device may retrieve, store, and/or transmit still images for display on the multimedia device and/or an external display.

In some embodiments, the term "external display" may refer to any device with one or more display elements (e.g., screens) that is capable of being connected to a multimedia device. In some embodiments, an external display may lack computing components such as a central processing unit, hard drive, and/or memory. In other embodiments, an external display may including computing components. Examples of external displays may include, without limitation, televisions (e.g., both "smart" and "dumb" televisions), computer monitors, tablets, etc.

In some embodiments, the term "action" may generally refer to any computing instruction or set of computing instructions performed by a multimedia device and/or the initiation of a state of the multimedia device. Examples of actions that the multimedia device can perform may include, without limitation, the activation of a microphone of the multimedia device (e.g., putting the device in a "listening" state), the activation of a camera of the multimedia device, a boot-up sequence of the multimedia device, a shut-down sequence of the multimedia device, a data processing operation performed by the multimedia device (e.g., a "thinking" state), a timer counting down on the multimedia device, a timed alarm triggering on the multimedia device, the initiation of an application on the multimedia device (e.g., an incoming call), the termination of an application on the multimedia device, and/or auditory output produced by the multimedia device.

The systems described herein may perform step 310 in a variety of ways. In one example, identification module 104 may identify action 208 by monitoring multimedia device 202 for actions (e.g., by monitoring various applications and/or processes). Additionally or alternatively, identification module 104 may identify action 208 by receiving a request (via, e.g., a user input device, such as a remote or microphone) for multimedia device 202 to perform action 208. In some examples, the systems described herein may receive a request to perform action from a local device, such as a remote control and/or mobile device. In other examples, the systems described herein may receive a request to perform an action from a remote device, for example by receiving an incoming call over a network.

As illustrated in FIG. 3, at step 320 one or more of the systems described herein may select, by the multimedia device, at least one visual pattern that corresponds to the action. For example, selection module 106 on multimedia device 202 may select, by multimedia device 202, at least one visual pattern 210 that corresponds to action 208.

The term "visual pattern," in some examples, may refer to an animation (i.e., a multi-part pattern that changes over time) and/or a static pattern displayed on any type of display element, including but not limited to a set of LEDs and/or a screen. In one embodiment, a visual pattern may include a sequence of light (e.g., a set of light emitters on the display element may light up in a predefined order). For example, a visual pattern may include a sequence of light that expands at least once (e.g., starting in the center and expanding outwards), a sequence of light that contracts at least once (e.g., starting in a horizontal line and contracting towards the center), a sequence of light that moves from left to right at least once (e.g., starting at the left edge of the display and/or starting at the middle of the display), a sequence of light that moves from right to left at least once (e.g., starting at the right edge of the display and/or starting at the middle of the display), and/or a sequence of light that pulses at least once (e.g., by appearing and then disappearing). In one embodiment, the visual pattern may include a sequence of light that expands and contracts repeatedly at a predetermined rate (e.g., once per second or three times per second) and/or a sequence of light that expands and contracts repeatedly at a rate determined by external input received by the multimedia device. For example, the rate by which an animation pulses may be determined by some characteristic of the action, such as the identity of the initiator of an incoming call (e.g., the multimedia device may be configured to pulse at a faster rate for calls from a user-defined group such as "family" than for calls outside the group). In another example, the rate may be determined by the volume of sounds captured by a microphone of the multimedia device (e.g., displaying wider and/or faster pulses in response to louder volume).

In some examples, similar but different visual patterns may correspond to different actions. For example, a visual pattern of a sequence of lights that expands and contracts at a certain rate may correspond to and visually indicate that the device is receiving an incoming call while a sequence of lights that expands and contracts at a different rate may correspond to a "thinking" state that visually indicates the device is processing input. In addition, a sequence of contracting lights may correspond to and visually indicate that the device is shutting down. In contrast, a sequence of expanding lights may correspond to and visually indicate that the device is booting up. In some embodiments, multiple cores visual patterns may be combined in different ways to indicate different actions. For example, a left-to-right animation followed by an expand-and-contract animation may indicate that the device is booting up, while an expand-and-contract animation followed by a right-to-left animation may indicate that the device is processing input.

In some examples, visual patterns that expand and contract and/or otherwise follow a repeating pattern of motion (e.g., side-to-side travel) may repeat a set number of times, such as three or five times. Additionally or alternatively, the visual pattern may repeat until a specific trigger, such as the termination of the action (e.g., if the action is processing input), initiation of a new action (e.g., answering an incoming call), and/or a time-out based on the type of action (e.g., automatically rejecting an incoming call and therefore ceasing displaying the "incoming call" pattern if no action is taken by the user within a minute).

As illustrated in FIG. 3, at step 330 one or more of the systems described herein may display, when the multimedia device performs the action, the visual pattern simultaneously on both the multimedia device and the external display to visually indicate that the action is being performed. For example, display module 108, may display, when multimedia device 202 performs action 208, visual pattern 210 simultaneously on both multimedia device 202 (e.g., on a display element 214) and external display 206 (e.g., by sending a message via a communication interface 212) to visually indicate that action 208 is being performed.

The term "simultaneously," in some examples, may refer to actions performed at the same time (within the same second) or almost the same time (within a few seconds). In one example, the external display and multimedia device may display the visual pattern simultaneously such that the visual pattern appears, animates, and/or disappears in a synchronized manner across both devices. In some embodiments, the multimedia device may time a message and/or other signal to external display such that the multimedia device and the external display simultaneously display the visual pattern. For example, the multimedia device may send the signal several microseconds before displaying the visual pattern to give the external display time to receive and process the signal. Additionally or alternatively, the multimedia device may include timing information in a message to the external display so that the multimedia device and the external display simultaneously display the visual pattern. For example, the multimedia device may send instructions that include a timestamp of when the external display should begin displaying the visual pattern.

Figure 4A:
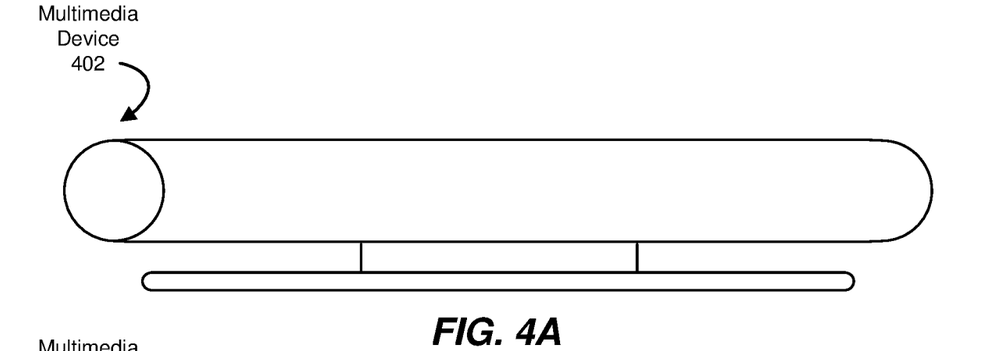
FIGS. 4A-4D are illustrations of exemplary synchronized visual indicators for multimedia device actions that expand from the center.
Figure 4B:
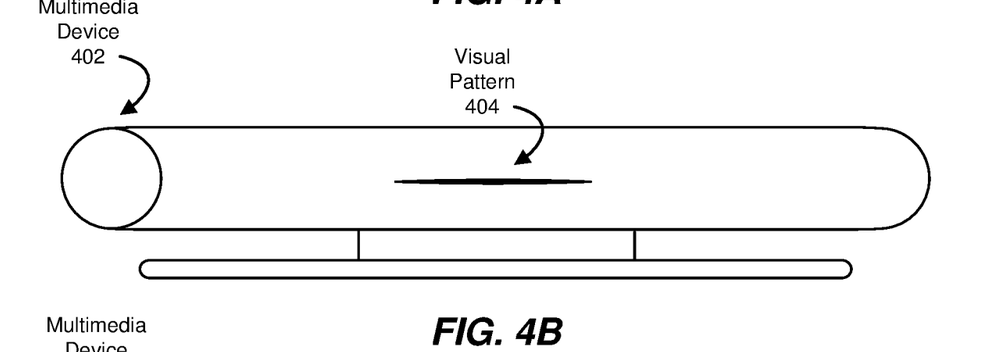
Figure 4C:
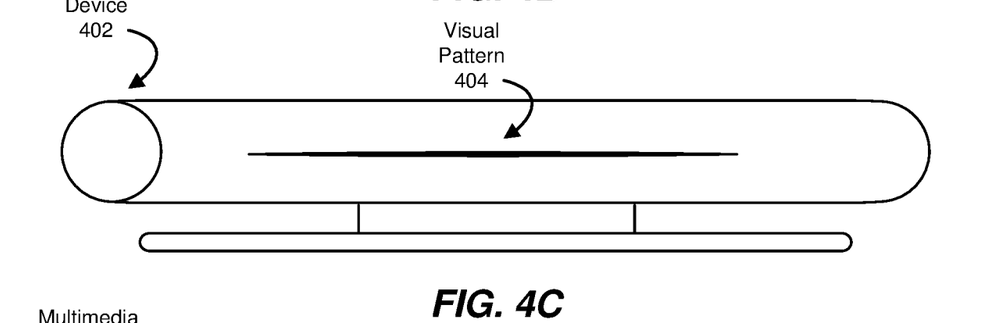
Figure 4D:
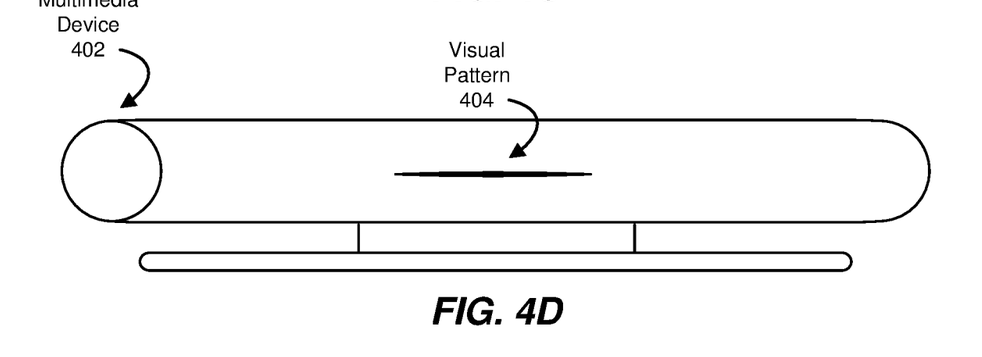

In some embodiments, the above-described multimedia device may have a display element that includes a horizontal row of LEDs that display the visual pattern. For example, as illustrated in FIG. 4A, a multimedia device 402 may begin with no visual pattern displayed. As illustrated in FIG. 4B, multimedia device 402 may display visual pattern 404 by initially displaying a small horizontal line. As shown in FIG. 4C, visual pattern 404 may expand outwards. In FIG. 4D, visual pattern 404 may retract inwards. In some examples, visual pattern 404 may expand and contract multiple times. For example, visual pattern 404 may expand and contract repeatedly while multimedia device 402 is in the "listening" stage (e.g., performing the activity of monitoring for user input via the microphone).

Figure 5A:
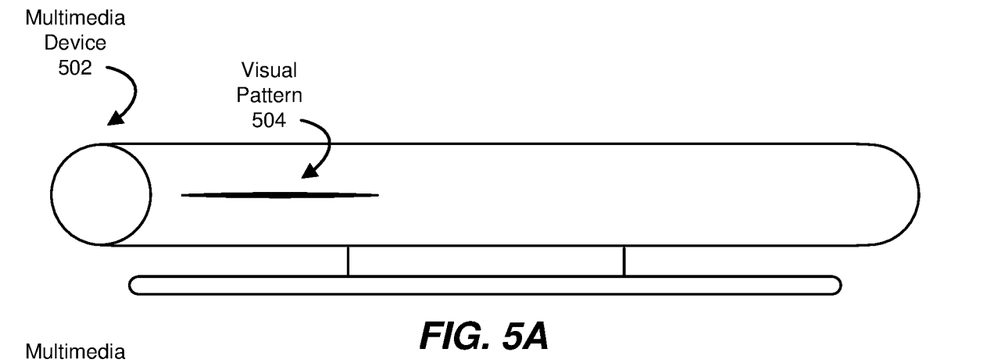
FIGS. 5A-5D are illustrations of additional exemplary synchronized visual indicators for multimedia device actions that travel from left to right.
Figure 5B:
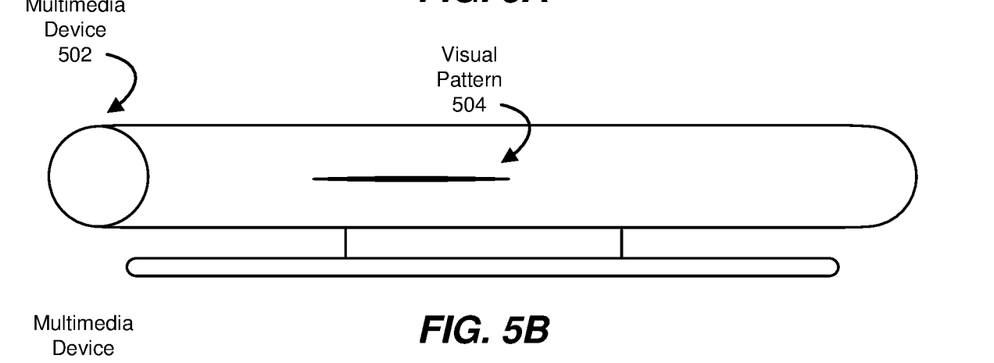
Figure 5C:
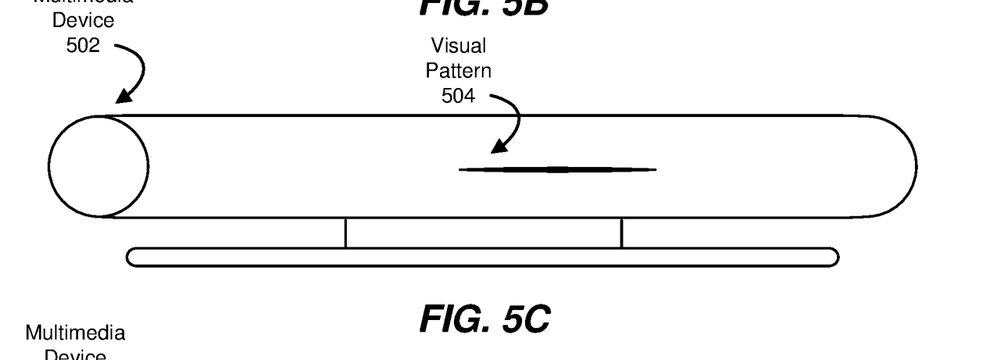
Figure 5D:
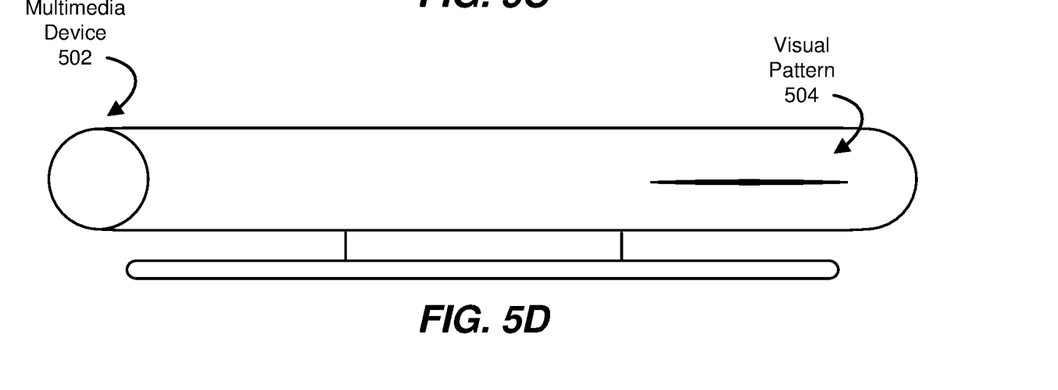

Additionally or alternatively, a horizontal row of LEDs may display a different visual pattern. For example, as illustrated in FIG. 5A a multimedia device 502 may display a visual pattern 504 as a small horizontal line of illuminated LEDs at the left edge of multimedia device 502. In some examples, as illustrated in FIG. 5B, visual pattern 504 may continue by illuminating a line of LEDs on the center-left of multimedia device 502. Continuing in FIG. 5C, visual pattern 504 may illuminate a set of LEDs further to the right, culminating in FIG. 5D, where a small horizontal line to the far right of multimedia device 502 is illuminated. In some examples, visual pattern 504 may cycle back through the positions illustrated in FIGS. 5C, 5B, and 5A, in that order. For example, the row of horizontal lights may appear to bounce back and forth from one edge of multimedia device 502 to the other. In another example, the row of horizontal lights may appear to cross multimedia device 502 from left to right and may then disappear and reappear at the left edge of multimedia device 502. In some examples, the row of lights may appear to travel from the left edge of multimedia device 502 to the center and then back again without reaching the right edge of multimedia device 502. In one example, visual pattern 504 may display a light bar that appears to bounce from left to right when multimedia device 502 is in the "thinking" state (e.g., performing the action of processing a user's command).

Figure 6A:
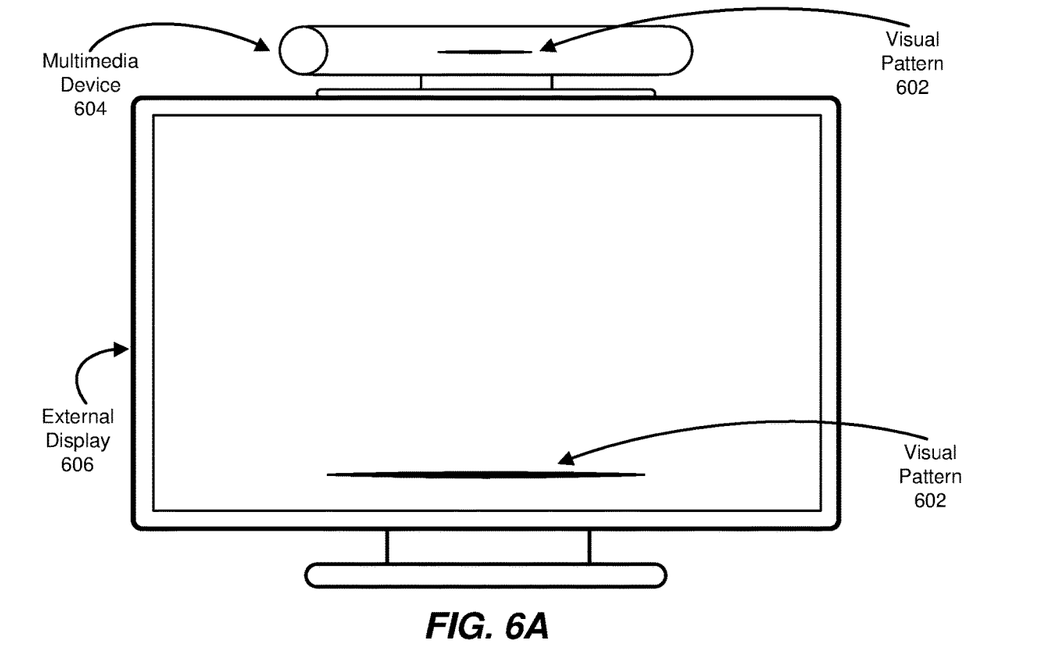
FIGS. 6A and 6B are illustrations of exemplary visual indicators for multimedia device actions, synchronized across a multimedia device and an external display.
Figure 6B:
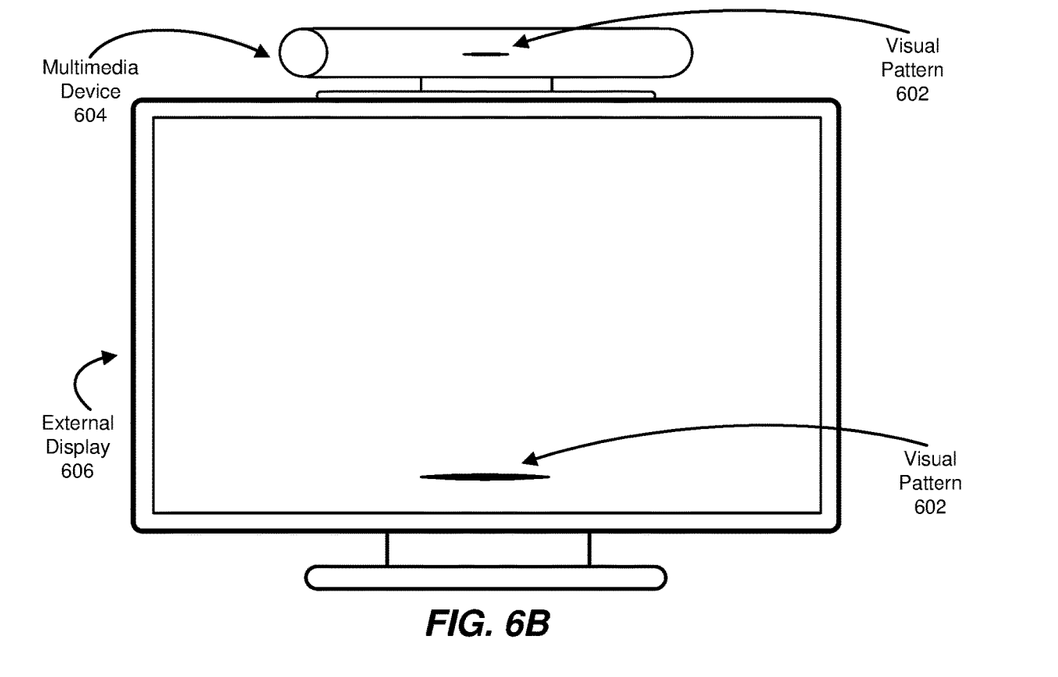

In some embodiments, the multimedia device may transmit instructions to and/or otherwise cause an external display to simultaneously display the visual pattern. For example, as illustrated in FIG. 6A, a multimedia device 604 may display a visual pattern 602 and may also cause an external display 606 to display visual pattern 602. In one example, visual pattern 602 may begin as a line of activated LEDs that occupies the middle third of the display surface of multimedia device 604 and an overlay of similar size and shape (e.g., relative to the width of external display 606) on external display 606. In some examples, visual pattern 602 may update in a synchronized fashion across external display 606 and multimedia device 604. For example, as illustrated in FIG. 6B, visual pattern 602 may shrink to a shorter line simultaneously on both multimedia device 604 and external display 606. In one example, visual pattern 602 may indicate that multimedia device 604 is in the process of powering off and/or shutting down.

In some embodiments, the instances of visual pattern 602 on multimedia device 604 and external display 606 may be identical in size, shape, color, and/or other characteristics. In other embodiments, the instances of visual pattern 602 on multimedia device 604 and external display 606 may be similar but not identical in size, shape, color, and/or other characteristics. For example, the instance of visual pattern 602 on external display 606 may be larger in absolute size but the same or similar in relative size to the instance of visual pattern 602 on the multimedia device. In some embodiments, the display element of external display 606 may be of a different type than the display element of multimedia device 604, causing differences in the rendering of visual pattern 602. For example, external display 606 may have a liquid crystal display (LCD) screen while multimedia device 604 may have an LED screen. In one embodiment, multimedia device 704 may display visual pattern 602 at a fixed intensity while external display 606 may display visual pattern 602 as an overlay of varying opacity.

Figure 7:
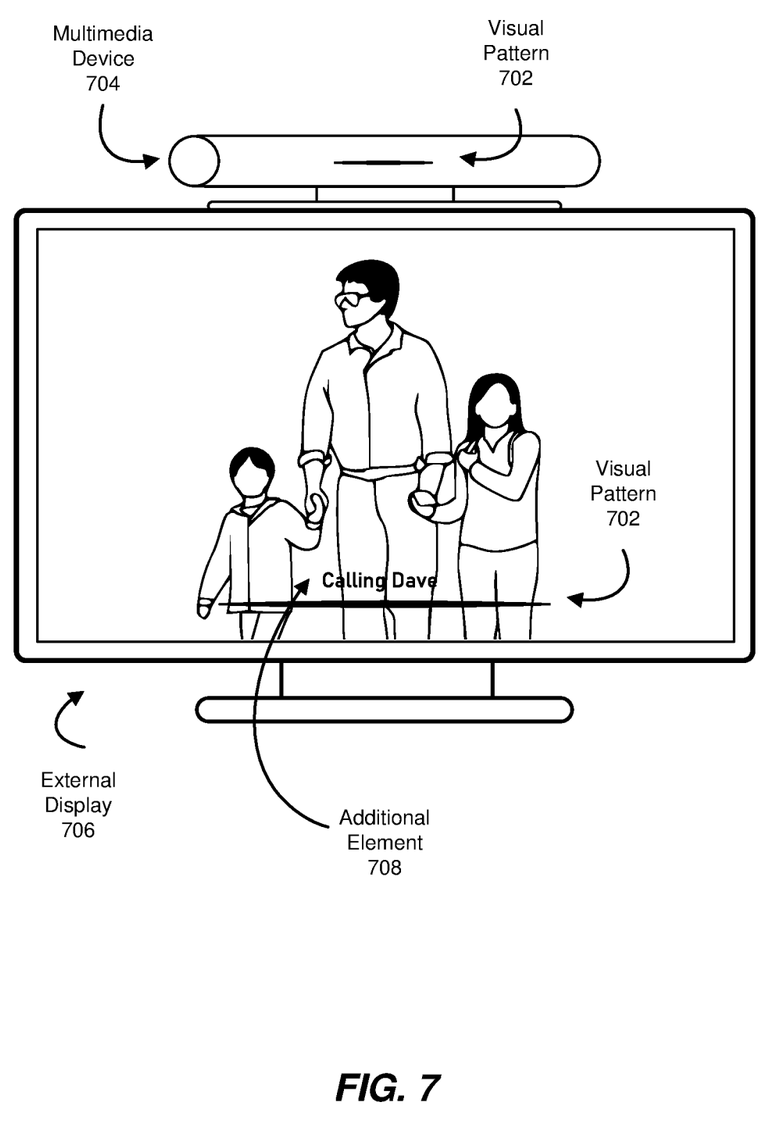
FIG. 7 is an illustration of exemplary synchronized visual indicators for multimedia device actions that include an overlay.

In some embodiments, the multimedia device and the external display may display different animations and/or the external display may display additional elements beyond the visual pattern. For example, as illustrated in FIG. 7, a multimedia device 704 and an external display 706 may both simultaneously display a visual pattern 702 and external display 706 may also display an additional element 708. In some embodiments, additional element 708 may include text, such as information about who is calling and/or being called on a voice and/or video call. In one embodiment, additional element 708 may include a voice-to-text rendering of spoken words captured by a microphone of multimedia device 704. In one example, when the multimedia device is in a "listening" state, additional element 708 may include text spoken by the user and/or the opacity, speed of animation, and/or amplitude of animation of visual pattern 702 may be affected by the volume of speech of the user. In another example, when the multimedia device is in a "thinking" state (e.g., processing data), additional element 708 may be at full opacity and/or visual pattern 702 may pulse (e.g., expand and contract) at a slower rate and/or lower amplitude than when the multimedia device is in the "listening" state.

Figure 8A:
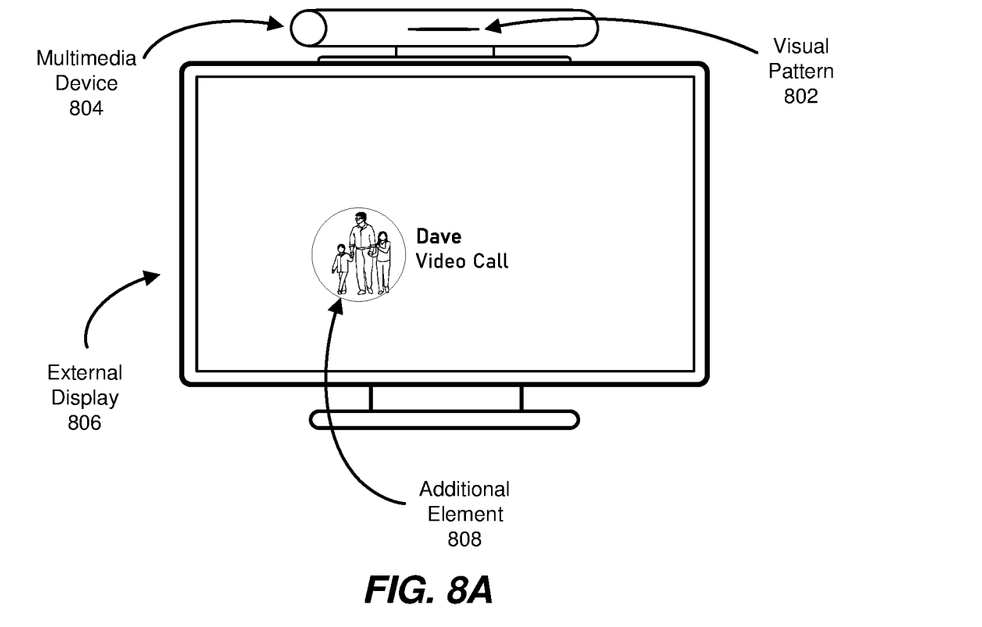
FIGS. 8A and 8B are illustrations of exemplary non-identical synchronized visual indicators.
Figure 8B:
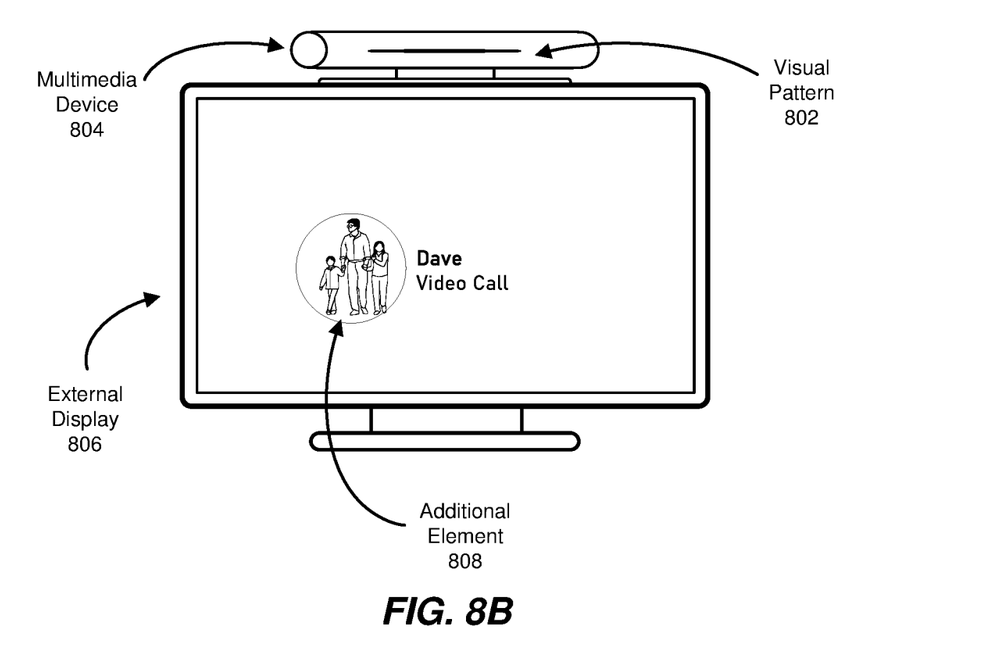

In some embodiments, the multimedia device may display a visual pattern that is synchronized with but not identical to a visual pattern displayed on the external display. For example, as illustrated in FIG. 8A, a multimedia device 804 may display a visual pattern 802 by illuminating a row of LEDs at the center of multimedia device 804. In one example, multimedia device 804 may also cause an external display 806 to display an additional element 808 that is not identical to visual pattern 802, such as a circle with a profile image and/or text. In some examples, as illustrated in FIG. 8B, multimedia device 804 may cause visual pattern 802 to pulse (e.g., expand and contract from the center of multimedia device 804) at the same rate as some or all of additional element 808 (e.g., the circle with the profile image) pulses. In one embodiment, multimedia device 804 may display a pulsing row of lights on multimedia device 804 and a pulsing, blinking, and/or otherwise animated caller image on external display 806 in response to an incoming call.

Figure 9:
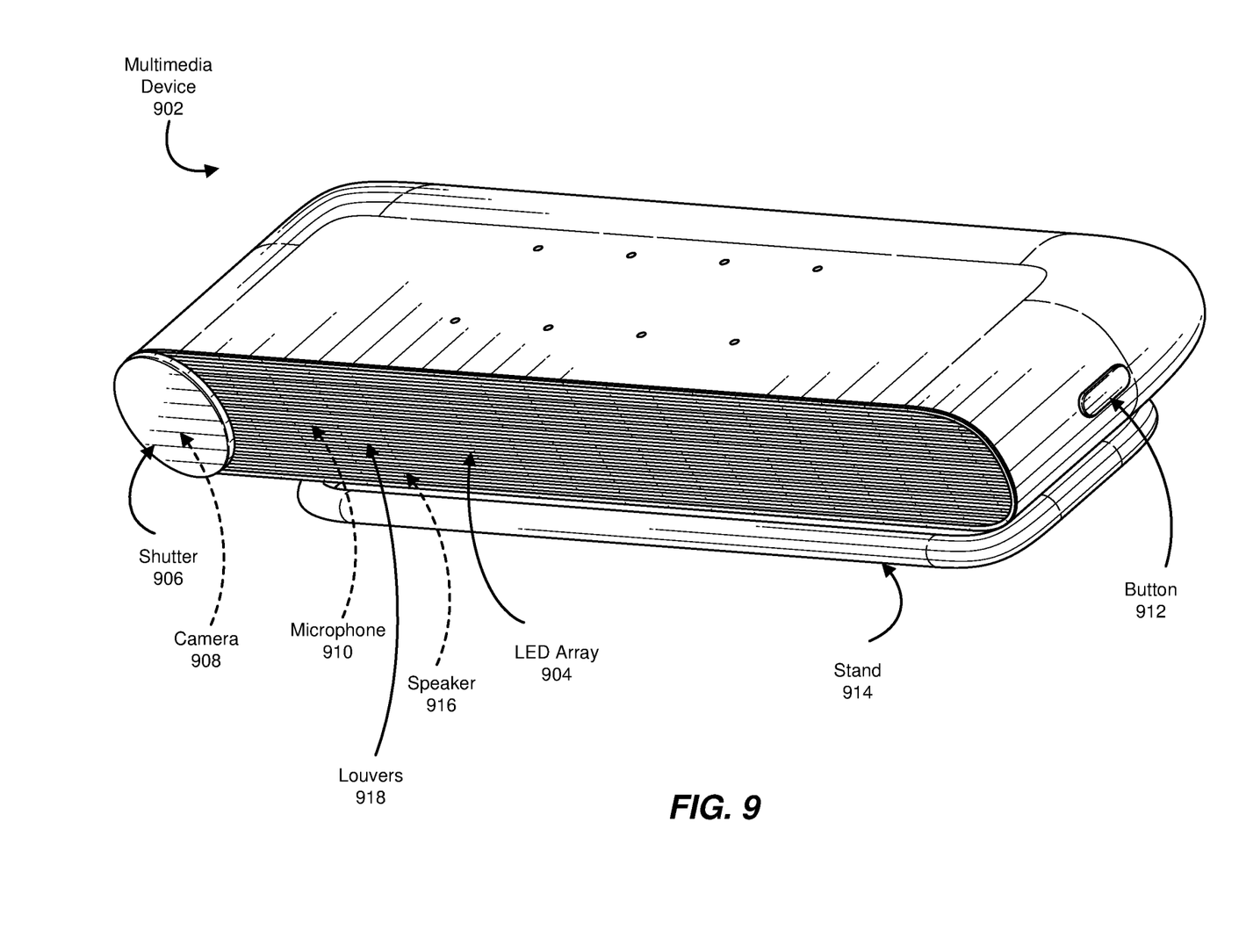
FIG. 9 is an illustration of an exemplary multimedia device.

The above-described multimedia device may include a variety of different elements. In some embodiments, the multimedia device may include a camera and/or a microphone configured to facilitate videoconferencing. For example, as illustrated in FIG. 9, a multimedia device 902 may include a camera 908 (not visible) optically covered by a physical shutter 906 configured to transition between an open position and a closed position. In one embodiment, multimedia device 902 may include a horizontal array of LEDs such as LED array 904. LED array 904 may represent LED arrays of various types and dimensions, such as a single row of LEDs, multiple rows of LEDs, and/or various types of LEDs including organic LEDs (OLEDs). In some embodiments, a microphone 910 and/or speaker 916 may be positioned near LED array 904 and/or near camera 908. In one embodiment, multimedia device 902 may include at least one louver, such as louvers 918 that cover at least one element of multimedia device 902, such as microphone 910 and/or speaker 916. In some embodiments, multimedia device 902 may include at least one button 912 configured to trigger a change in status of multimedia device 902 in response to receiving user input. For example, button 912 may turn multimedia device on and/or off when pressed. In one example, multimedia device 902 may include a stand 914 configured to secure multimedia device 902 to the external display. In some embodiments, multimedia device 902 may include various hardware, firmware, and/or software components that enable multimedia device 902 to process input, send and/or receive messages via local and/or remote networks, and/or perform other computing tasks.

As explained above, the systems and methods described herein may display and/or facilitate the display of synchronized visualizations across multiple devices. For example, when a multimedia device receives an incoming call, the systems described herein may display an animation correlated with incoming calls on both the multimedia device and on an external display, such as a television. In some examples, the systems described herein may also display additional information on the external display, such as the identity of the caller. By displaying synchronized visualizations correlated to an action and/or state of the multimedia device, the systems described herein may increase the usability of the multimedia device and/or improve the user experience. In some examples, simultaneously displaying the visualization on both the multimedia device and an external display may make it easier for users to locate and/or identify the visualization. By displaying various static patterns and/or animations correlated with various actions, the systems described herein may inform users about the status of the multimedia device, improve user comfort with the multimedia device, and/or facilitate more intuitive use of the multimedia device.

EXAMPLE EMBODIMENTS

Example 1

A computer-implemented method for synchronizing visual displays may include (i) identifying, by a multimedia device that is connected to an external display, an action that is to be performed by the multimedia device, (ii) selecting, by the multimedia device, at least one visual pattern that corresponds to the action, and (iii) displaying, when the multimedia device performs the action, the visual pattern simultaneously on both the multimedia device and the external display to visually indicate that the action is being performed.

Example 2

The computer-implemented method of Example 1, where the visual pattern includes at least one of a static visual pattern or an animation.

Example 3

The computer-implemented method of Examples 1 and 2, further including synchronizing the animation displayed on both the multimedia device and the external display.

Example 4

The computer-implemented method of Examples 1 and 2, further including synchronizing at least one aspect of different animations displayed on the multimedia device and the external display.

Example 5

The computer-implemented method of Example 1, where displaying the visual pattern simultaneously on both the multimedia device and the external display includes simultaneously displaying the same visual pattern on both the multimedia device and the external display.

Example 6

The computer-implemented method of Example 1, where displaying the visual pattern on the external display includes overlaying the visual pattern on top of multimedia content displayed on the external display.

Example 7

The computer-implemented method of Example 1, further including displaying text on the external display in addition to the visual pattern that is displayed on the external display.

Example 8

The computer-implemented method of Example 1, where displaying the visual pattern on the multimedia device includes displaying a sequence of light on an array of light-emitting diodes.

Example 9

The computer-implemented method of Example 1, where the visual pattern includes at least one of a sequence of light that expands at least once, a sequence of light that contracts at least once, a sequence of light that moves from left to right at least once, a sequence of light that moves from right to left at least once, or a sequence of light that pulses at least once.

Example 10

The computer-implemented method of Example 1, where the visual pattern includes at least one of a sequence of light that expands and contracts repeatedly at a predetermined rate or a sequence of light that expands and contracts repeatedly at a rate determined by external input received by the multimedia device.

Example 11

The computer-implemented method of Example 1, where the action includes at least one of an activation of a microphone of the multimedia device, an activation of a camera of the multimedia device, a boot-up sequence of the multimedia device, a shut-down sequence of the multimedia device, a data processing operation performed by the multimedia device, a timer counting down on the multimedia device, a timed alarm triggering on the multimedia device, an initiation of an application on the multimedia device, a termination of an application on the multimedia device, or an auditory output produced by the multimedia device.

Example 12

A multimedia device may include (i) a display element, (ii) a communication interface that facilitates communication between the multimedia device and an external display, and (iii) a processor configured to identify an action that is to be performed by the multimedia device, select at least one visual pattern that corresponds to the action and cause, when the multimedia device performs the action, the display element of the multimedia device and the external display to simultaneously display the visual pattern to visually indicate that the action is being performed.

Example 13

The multimedia device of Example 12, where the visual pattern includes at least one of a static visual pattern or an animation.

Example 14

The multimedia device of Example 12, where the multimedia device includes at least one of a camera or a microphone configured to facilitate videoconferencing.

Example 15

The multimedia device of Example 12, where the multimedia device includes a physical camera shutter configured to transition between an open position and a closed position.

Example 16

The multimedia device of Example 12, where the display element of the multimedia device includes a horizontal array of light-emitting diodes.

Example 17

The multimedia device of Example 12, where the multimedia device includes at least one louver that is configured to cover at least one physical component of the multimedia device.

Example 18

The multimedia device of Example 12, where the multimedia device includes at least one physical button configured to trigger a change in status of the multimedia device in response to receiving user input.

Example 19

The multimedia device of Example 12, where the multimedia device includes a stand component configured to secure the multimedia device to the external display.

Example 20

A non-transitory computer-readable medium may include one or more computer-executable instructions that, when executed by at least one processor of a computing device, cause the computing device to (i) identify, by a multimedia device that is connected to an external display, an action that is to be performed by the multimedia device, (ii) select, by the multimedia device, at least one visual pattern that corresponds to the action, and (iii) display, when the multimedia device performs the action, the visual pattern simultaneously on both the multimedia device and the external display to visually indicate that the action is being performed.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive action data to be transformed, transform the by correlating the action data with a list of visual patterns, output a result of the transformation to display a visual pattern, use the result of the transformation to display a visual pattern, and store the result of the transformation to maintain an activity log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying, by a multimedia device that is connected to an external display, an action that is to be performed by the multimedia device;
   selecting, by the multimedia device, at least one visual pattern that corresponds to the action; and displaying, when the multimedia device performs the action, the visual pattern simultaneously on both the multimedia device and the external display to visually indicate that the action is being performed.

2. The computer-implemented method of claim 1, wherein the visual pattern comprises at least one of:
   a static visual pattern; or
   an animation.

3. The computer-implemented method of claim 2, further comprising synchronizing the animation displayed on both the multimedia device and the external display.

4. The computer-implemented method of claim 2, further comprising synchronizing at least one aspect of different animations displayed on the multimedia device and the external display.

5. The computer-implemented method of claim 1, wherein displaying the visual pattern simultaneously on both the multimedia device and the external display comprises simultaneously displaying the same visual pattern on both the multimedia device and the external display.

6. The computer-implemented method of claim 1, wherein displaying the visual pattern on the external display comprises overlaying the visual pattern on top of multimedia content displayed on the external display.

7. The computer-implemented method of claim 1, further comprising displaying text on the external display in addition to the visual pattern that is displayed on the external display.

8. The computer-implemented method of claim 1, wherein displaying the visual pattern on the multimedia device comprises displaying a sequence of light on an array of light-emitting diodes.

9. The computer-implemented method of claim 1, wherein the visual pattern comprises at least one of:
   a sequence of light that expands at least once;
   a sequence of light that contracts at least once;
   a sequence of light that moves from left to right at least once;
   a sequence of light that moves from right to left at least once; or
   a sequence of light that pulses at least once.

10. The computer-implemented method of claim 1, wherein the visual pattern comprises at least one of:
    a sequence of light that expands and contracts repeatedly at a predetermined rate; or
    a sequence of light that expands and contracts repeatedly at a rate determined by external input received by the multimedia device.

11. The computer-implemented method of claim 1, wherein the action comprises at least one of:
    an activation of a microphone of the multimedia device;
    an activation of a camera of the multimedia device;
    a boot-up sequence of the multimedia device;
    a shut-down sequence of the multimedia device;
    a data-processing operation performed by the multimedia device;
    a timer counting down on the multimedia device;
    a timed alarm triggering on the multimedia device;
    initiation of an application on the multimedia device;
    termination of an application on the multimedia device; or
    an auditory output produced by the multimedia device.

12. A multimedia device comprising:
    a display element;
    a communication interface that facilitates communication between the multimedia device and an external display; and
    a processor configured to:
       identify an action that is to be performed by the multimedia device;
       select at least one visual pattern that corresponds to the action; and
       cause, when the multimedia device performs the action, the display element of the multimedia device and the external display to simultaneously display the visual pattern to visually indicate that the action is being performed.

13. The multimedia device of claim 12, wherein the visual pattern comprises at least one of:
    a static visual pattern; or
    an animation.

14. The multimedia device of claim 12, wherein the multimedia device comprises at least one of a camera or a microphone configured to facilitate videoconferencing.

15. The multimedia device of claim 12, wherein the multimedia device comprises a physical camera shutter configured to transition between an open position and a closed position.

16. The multimedia device of claim 12, wherein the display element of the multimedia device comprises a horizontal array of light-emitting diodes.

17. The multimedia device of claim 12, wherein the multimedia device comprises at least one louver that is configured to cover at least one physical component of the multimedia device.

18. The multimedia device of claim 12, wherein the multimedia device comprises at least one physical button configured to trigger a change in status of the multimedia device in response to receiving user input.

19. The multimedia device of claim 12, wherein the multimedia device comprises a stand component configured to secure the multimedia device to the external display.

20. A non-transitory computer-readable medium comprising one or more computer-executable instructions that, when executed by at least one processor of a computing device, cause the computing device to:
    identify, by a multimedia device that is connected to an external display, an action that is to be performed by the multimedia device;
    select, by the multimedia device, at least one visual pattern that corresponds to the action; and
    display, when the multimedia device performs the action, the visual pattern simultaneously on both the multimedia device and the external display to visually indicate that the action is being performed.

* * * * *